US009258345B2

(12) United States Patent
Zhu et al.

(10) Patent No.: US 9,258,345 B2
(45) Date of Patent: *Feb. 9, 2016

(54) FULL-DUPLEX BI-DIRECTIONAL COMMUNICATION OVER A REMOTE PROCEDURE CALL BASED COMMUNICATIONS PROTOCOL, AND APPLICATIONS THEREOF (71) Applicant: Google Inc., Mountain View, CA (US)

(72) Inventors: Wenbo Zhu, Los Altos, CA (US); Kevin Yu, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,986

(22) Filed: Jun. 17, 2014

(65) Prior Publication Data
US 2014/0297731 A1 Oct. 2, 2014

Related U.S. Application Data (63) Continuation of application No. 13/715,885, filed on Dec. 14, 2012, now Pat. No. 8,769,116, which is a continuation of application No. 13/245,104, filed on Sep. 26, 2011, now Pat. No. 8,356,100.

(60) Provisional application No. 61/411,321, filed on Nov. 8, 2010.

(51) Int. Cl.
*H04L 29/06* (2006.01)
*H04L 29/08* (2006.01)
(52) U.S. Cl.
CPC ............... *H04L 65/60* (2013.01); *H04L 67/02* (2013.01); *H04L 67/141* (2013.01); *H04L 67/40* (2013.01); *H04L 69/163* (2013.01); *H04L 69/162* (2013.01)

(58) Field of Classification Search
CPC ......... H04L 67/02; H04L 67/14; H04L 67/22; H04L 67/34; H04L 69/16; H04L 69/163
See application file for complete search history.

(56) References Cited

U.S. PATENT DOCUMENTS 5,774,479 A 6/1998 Lee et al.
6,446,192 B1 9/2002 Narasimhan et al.
(Continued)

FOREIGN PATENT DOCUMENTS

CN 101795206 A 8/2010

OTHER PUBLICATIONS

Oak et al., "HTML 5 WebSocket cracks the HTTP request-response barrier", Sep. 26, 2008, www.indicthreads.com; 8 pages.
(Continued)

Primary Examiner — Ramy M Osman
(74) Attorney, Agent, or Firm — McDermott Will & Emery LLP (57) ABSTRACT Systems and methods for reducing the cost but increasing the performance caused in streaming data between a client and a server are described herein. Embodiments of the present invention relate to reducing the cost but increasing the performance by the traditional data streaming where two TCP connections, one for each direction of traffic is used. Further embodiments allow a server in communication with one or more clients using a RPC based communication protocol to bi-directional stream not on two TCP connections but a single TCP connection. In one embodiment, this is achieved by transmitting from the client to the server an initial handshake. If the server receives the handshake, then the client streams a request stream to the server and the server streams a response stream to the client simultaneously over the same single TCP connection establishing full-duplex streaming.

28 Claims, 6 Drawing Sheets (56) References Cited

U.S. PATENT DOCUMENTS

| | | | |
|---|---|---|---|
| 7,523,216 B1* | 4/2009 | Christopher | 709/236 |
| 7,610,331 B1* | 10/2009 | Genske et al. | 709/203 |
| 7,818,377 B2 | 10/2010 | Whitney et al. | |
| 8,356,100 B2* | 1/2013 | Zhu et al. | 709/227 |
| 8,769,116 B2* | 7/2014 | Zhu et al. | 709/227 |
| 2003/0014624 A1 | 1/2003 | Maturana et al. | |
| 2005/0027859 A1 | 2/2005 | Alvisi et al. | |
| 2005/0210129 A1 | 9/2005 | Feng et al. | |
| 2006/0029016 A1 | 2/2006 | Peles | |
| 2006/0056413 A1 | 3/2006 | Ikeda et al. | |
| 2007/0112962 A1 | 5/2007 | Lewontin | |
| 2007/0198656 A1 | 8/2007 | Mazzaferri et al. | |
| 2008/0209063 A1 | 8/2008 | Lee et al. | |
| 2009/0077253 A1 | 3/2009 | Ashwin et al. | |
| 2009/0222818 A1 | 9/2009 | Valentin | |
| 2010/0142418 A1 | 6/2010 | Nishioka et al. | |
| 2010/0202329 A1* | 8/2010 | Nishioka et al. | 370/296 |
| 2010/0281107 A1 | 11/2010 | Fallows et al. | |
| 2011/0035523 A1* | 2/2011 | Feero et al. | 710/110 |
| 2012/0124219 A1 | 5/2012 | Zhu et al. | |
| 2013/0227148 A1 | 8/2013 | Zu et al. | |
| 2014/0297731 A1* | 10/2014 | Zhu et al. | 709/203 |

OTHER PUBLICATIONS

Schulze, Alexander, "jWebSocket instead of XHR and Comet", Jun. 17, 2010, blog.jwebsocket.org; 20 pages.

Hickson, Google Inc, "The Websocket Protocol", May 23, 2010; 56 pages.

MS-RPCH, "Remote Procedure Call over HTTP Protocol Specification", Internet Archive from Feb. 28, 2008, http://msdn.microsoft.com/en-us/library/cc243952; 171 pages.

Fette, I., "The WebSocket Protocol; draft-ietf-hybi-thewebsocketprotocol-03.txt", Internet Engineering Task Force, Oct. 17, 2010; 60 pages.

Montenegro, G., et al., "HyBi WebSocket Requirements and Features; draft-ietf-hybi-websocket-requirements-01.txt", Internet Engineering Task Force, Aug. 23, 2010; 9 pages.

Qveflander, N., "Pushing real time data using HTML5 Web Sockets", Department of Computing Science, Umeå University, Aug. 17, 2010; 76 pages.

Zhu, W., et al., "Implications of Full-Duplex HTTP; draft-zhu-http-fullduplex-01.txt", Internet Engineering Task Force, May 24, 2010; 7 pages.

International Search Report with the Written Opinion of the International Searching Authority directed to related International Patent Application No. PCT/US2011/058957, mailed Feb. 16, 2012, from the European Patent Office; 11 pages.

Office Action directed to related Chinese Patent Application No. 201180053899.8, mailed May 11, 2015, with attached English Translation; 30 pages.

English-language abstract of Chinese Patent Application Publication No. 101795206 A; 2 pages.

* cited by examiner

FIG. 6

FULL-DUPLEX BI-DIRECTIONAL COMMUNICATION OVER A REMOTE PROCEDURE CALL BASED COMMUNICATIONS PROTOCOL, AND APPLICATIONS THEREOF

CROSS-REFERENCE TO RELATED APPLICATIONS

This application is a Continuation of U.S. application Ser. No. 13/715,885, filed on Dec. 14, 2012, which is a Continuation of U.S. application Ser. No. 13/245,104, filed on Sep. 26, 2011, now U.S. Pat. No. 8,356,100, which claims the benefit of U.S. Provisional Application No. 61/411,321, filed on Nov. 8, 2010, which are incorporated herein by reference in their entirety.

BACKGROUND

Hypertext Transfer Protocol (HTTP) is a stateless, Remote Procedure Call (RPC) style protocol which requires communication between client and server and follows a strict request-response pattern. HTTP streams data from either client to server or server to client. Currently, bi-directional streaming from client to server and server to client requires two transmission control protocol (TCP) connections to stream data between the client and server separately. A first TCP connection is used by the client to stream a request to the server while a second TCP connection is used by the server to stream a response to the client.

For example, for client to server communication, methods include a Hanging GET, long polling, and polling. The Hanging GET method includes a pending RPC protocol that allows the server to stream response data to the client at any time. The request from the client does not include an initial handshake request and the request does not contain data. The long polling method is similar to the Hanging GET method but the response from the server is terminated for each piece of data that the server sends to the client. The client is required to initiate a new RPC protocol to receive the next message. The polling method requires the client to poll the server by generating a new RPC protocol periodically to receive data from the server.

For example, for server to client communication, methods include sending one request at a time and a long-lived request. The sending of one request at a time method requires that the first request be sent as a handshake request that carries application-layer protocol semantics. The long-lived request method requires that a single RPC protocol continues to send request data to the server. When the streaming of request data is finished, the RPC protocol is completed.

These dual TCP connection approaches are bi-directional but are not full-duplex. Such dual TCP connection approaches incur added costs that in turn introduces added overhead. The added TCP connection consumes system and network resources. The request streaming and response streaming that each occur on different TCP connections require that both connections remain activated. This adds additional network traffic. The dual TCP connection approach also makes HTTP insufficient to be used as a standalone protocol while requiring additional application-level protocols to handle the two connections.

BRIEF SUMMARY

Embodiments relate to data streaming capabilities between a server and a client. In a first embodiment, a computer implemented method provides a full-duplex capable client a capability to establish a full-duplex bi-directional communication stream over a remote procedure call based communication protocol by way of a single protocol connection. Full-duplex communication is initiated over a single protocol connection between the full-duplex capable client and a server via a network where the full-duplex capable client is configured to engage the server by sending an initial handshake to the server. A client request stream is streamed by the full-duplex client to the server following an acceptance of the initial handshake by the server via the network over the single protocol connection. A response stream is accepted from the server over the single protocol connection while the full-duplex capable client streams the client request stream over the single protocol connection. The full-duplex bi-directional communication stream is enabled over the remote procedure call based communication protocol when the client request stream and the response stream communicate over the single protocol connection simultaneously.

In a second embodiment, a system provides a full-duplex capable server with the capability to establish a full-duplex bi-directional communication stream over a remote procedure call based communication protocol by way of a single protocol connection. A server connection module finalizes an initialization of full-duplex communication over a single protocol connection between the full-duplex capable server and a client via a network where the full-duplex capable server is configured to accept an initial handshake from the client. A server acceptance module accepts a request stream over the single protocol connection. A server delivery module transfers the request stream received by the full-duplex capable server to a server application. A server streaming module streams a server response stream to the client that includes an application response to the request stream by the application via the network over the single protocol connection. A server enablement module enables a full-duplex bi-directional communication stream over the remote procedure call based communication protocol when the server response stream and the request stream use the single protocol connection simultaneously.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

Full-duplex bi-directional communication provides a capability for a server to stream data to a client and a client to stream data to a server simultaneously over a single protocol connection. In the Detailed Description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to effect such feature, structure, or characteristic in connection with other embodiments whether or not explicitly described.

Overview

Figure 1:
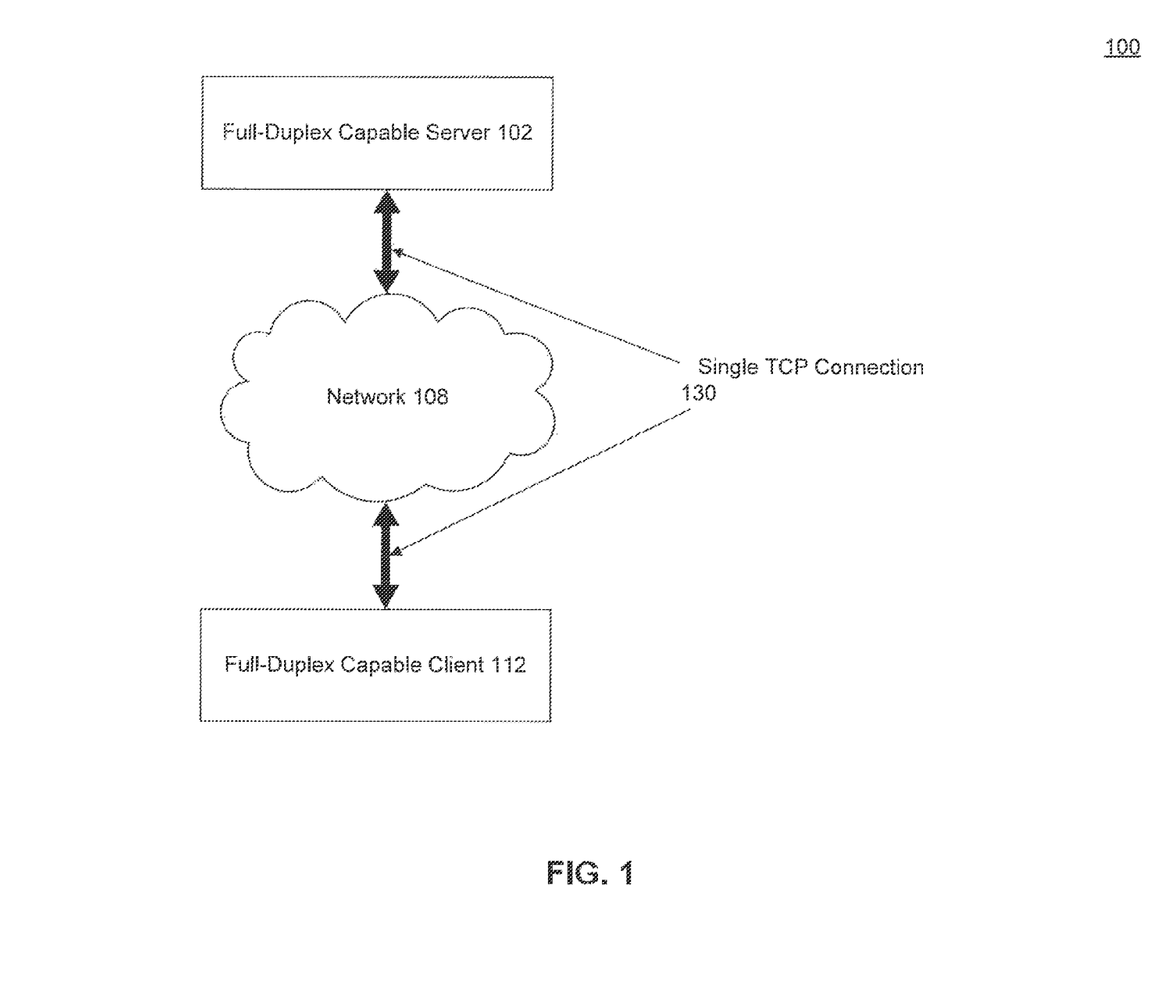
FIG. 1 illustrates a full-duplex bi-directional communication system, according to an embodiment.

FIG. 1 illustrates a client-server network system 100 in which embodiments, or portions thereof, may be implemented. System 100 includes a full-duplex capable server 102, a full-duplex capable client 112, a network 108, and a single TCP connection 130.

Generally speaking, one or more full-duplex capable clients 112 connect to a full-duplex capable server 102 over a network 108. In embodiments, a full-duplex capable server 102 may include a conventional web server, email server, or file transfer server modified according to the teachings in this disclosure. Full-duplex capable server 102 may be a device that includes at least one processor, at least one memory, and at least one network interface.

Full-duplex capable client 112 may be a device that includes at least one processor, at least one memory, and at least one network interface. For example, full-duplex capable client 112 may be implemented on a personal computer, handheld computer, personal digital assistant, smart phone, a mobile telephone, a game console, a set-top box, and the like.

Network 108 may include one or more networks, such as the Internet. In some examples, network 108 may include one or more wide area networks (WAN) or local area networks (LAN). Network 108 may include one or more network technologies such as Ethernet, Fast Ethernet, Gigabit Ethernet, a variant of the IEEE 802.11 standard such as WiFi, and the like. Communication over network 108 takes place using one or more network communication protocols including reliable streaming protocols such as TCP. These examples are illustrative and not intended to limit the present disclosure.

Full-duplex capable client 112 and full-duplex capable server 102 may be in data communication over network 108 using a protocol such as TCP. TCP is a reliable streaming protocol, also known as a guaranteed delivery protocol or connection-oriented protocol, where "reliable" and "guaranteed delivery" refer to the nature of the protocol to ensure data delivery. Reliable streaming protocols provide reliable, ordered delivery of a stream of bytes from one computer to another computer. Reliable streaming protocols ensure data delivery by managing message transmission and acknowledgment, dropped data segment retransmission, and delivery timeout, among other things. Reliable streaming protocols can be contrasted with "simple" or "connectionless" transmission protocols that do not provide reliable delivery of data segments. One such example of a connectionless protocol is the User Datagram Protocol (UDP). In the UDP, there is no indication whether a data segment sent to a recipient is lost during transmission. As would be appreciated by one having skill in the relevant art(s) given the description herein, remote procedure protocol (RPC) is an application layer protocol that implements a communication layer protocol such as but not limited to TCP.

Embodiments herein are described with reference to TCP as an exemplary reliable streaming protocol; however, it is within the knowledge of one skilled in the art to identify other reference reliable streaming protocols that are adaptable according to the teachings in this disclosure.

One approach to enabling data communication between full-duplex capable server 102 and full-duplex capable client 112 is to establish full-duplex bi-directional communication between full-duplex capable server 102 and full-duplex capable client 112. For example, full-duplex bi-directional communication enables data streaming between full-duplex capable server 102 and full-duplex capable client 112 over a single protocol connection, as opposed to the conventional approach of bi-directional communication on separate protocol connections.

Full-Duplex Bi-Directional Communication

Figure 2:
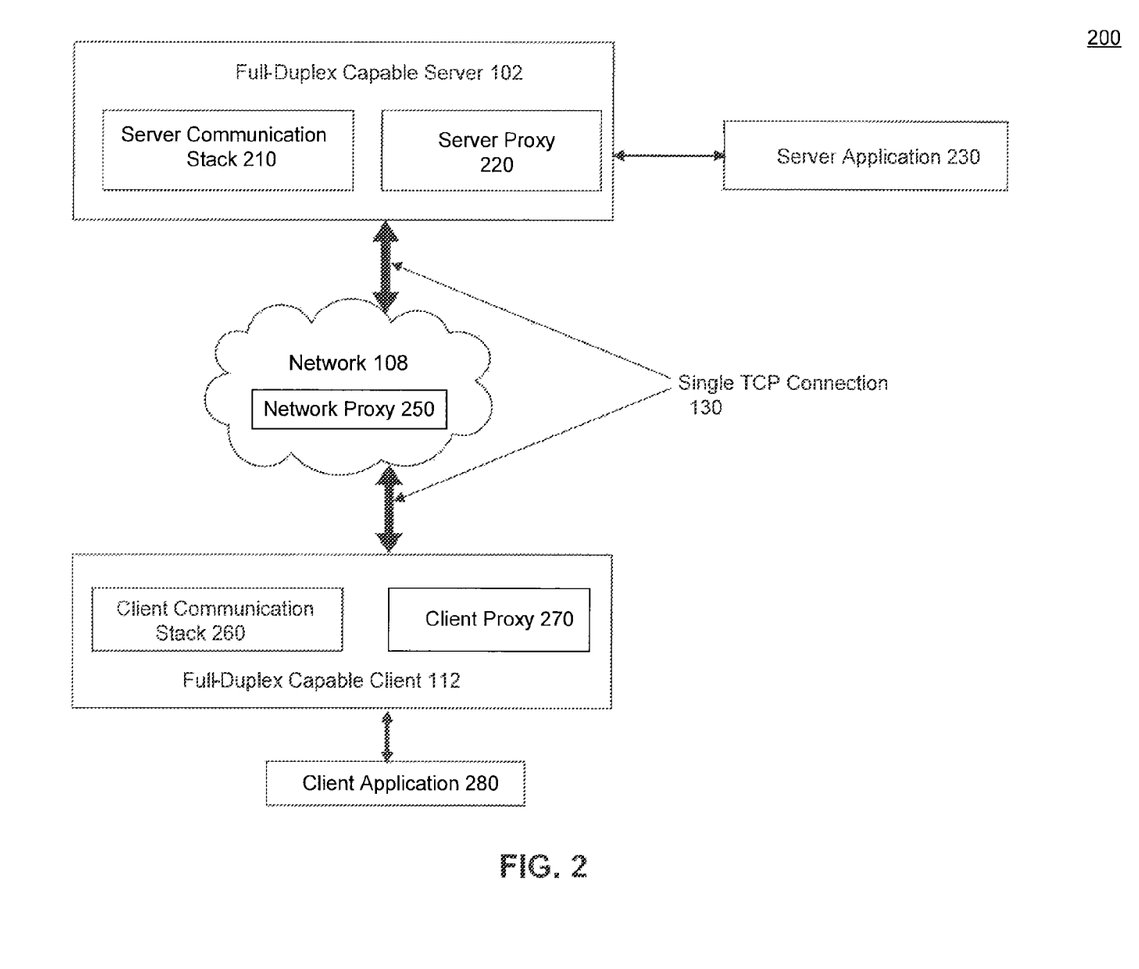
FIG. 2 illustrates a full-duplex bi-directional communication system including a client application and a server application, according to an embodiment.

FIG. 2 depicts an example full-duplex bi-directional communication system 200 in which embodiments, or portions thereof, may be implemented. System 200 includes full-duplex capable server 102, full-duplex capable client 112, network 108, a client application 280, a server application 230, and single TCP connection 130. Full-duplex capable server 102 includes a server communication stack 210 and a server proxy 220. Full-duplex capable client 112 includes a client communication stack 260 and a client proxy 270. Network 108 includes network proxy 250.

In an embodiment, full-duplex capable client 112 and full-duplex capable server 102 engage in full-duplex bi-directional communication over single TCP connection 130 using an RPC communication protocol. In order to make such bi-directional communication possible without breaking the semantics of the RPC protocol, the RPC protocol is altered through a protocol extension that inserts the necessary semantics to allow such bi-directional communication. Specifically, the full-duplex bi-directional communication over single TPC connection 130 follows the RPC communication protocol semantics, such as basic HTTP request-response semantics, with the added semantics supporting bi-directional communication. In this manner, full-duplex bidirectional communication over single TCP connection 130 using HTTP provides simultaneous streaming between full-duplex capable server 102 and full-duplex capable client 112.

For example, full-duplex capable server 102 may send a response to full-duplex capable client 112 simultaneously with full-duplex capable client 112 sending a request to full-duplex capable server 102. Both full-duplex capable server 102 and full-duplex capable client 112 are explicitly designed to support simultaneous streaming. Standard HTTP is not sufficient to alone support full-duplex bi-directional communication over single TCP connection 130. The additional protocol requirements enable full-duplex capable server 102 and full-duplex capable client 112 to effectively engage in full-duplex bidirectional communication over single TCP connection 130 using a RPC protocol such as HTTP.

Full-duplex capable client 112 initiates a request data stream over a RPC based communication protocol by way of single TCP connection 130 to full-duplex capable server 102 via network 108. Full-duplex capable server 102 receives the request data stream. Full-duplex capable server 102 responds to the request data stream by initiating a response data stream. Full-duplex capable server 102 streams the response data stream over a RPC based communication protocol by way of single TCP connection 130 to full-duplex capable client 112 via network 108. Full-duplex capable client 112 receives the response data stream. The request data stream and the response data stream operate simultaneously over single TCP connection 130 establishing full-duplex bi-directional communication.

In an embodiment, client application 280 and server application 230 communicate with full-duplex capable client 112 and full-duplex capable server 102, respectively. As noted above, full-duplex capable client 112 may be implemented on a personal computer, handheld computer, personal digital assistant, smart phone, a mobile telephone, a game console, a set-top box, and the like. As would be appreciated by one having skill in the relevant art(s) given the description herein, client application 280 includes an application that operates on any of the above. As would be appreciated by one having skill in the relevant art(s) given the description herein, server application 230 includes an application that operates on any of the above.

Client application 280 initiates a request to full-duplex capable client 112 to communicate with server application 230. Full-duplex capable client 112 initiates a request data stream that contains the request of client application 280 to full-duplex capable server 102. Full-duplex capable server 102 receives the request data stream and delivers the request from client application 280 in real-time to server application 230. Server application 230 processes the request and sends a response to the request to full-duplex capable server 102. Full-duplex capable server 102 initiates the response data stream that contains the response to the request sent by server application 230. Full-duplex capable server 102 streams the response data stream to full-duplex capable client 112. Full-duplex capable client 112 receives the response data stream and delivers the response from server application 230 to client application 280. The request data stream and the response data stream operate simultaneously over single TCP connection 130 establishing full-duplex bi-directional communication.

In an embodiment, full-duplex bi-directional communication between full-duplex capable client 112 and full-duplex capable server 102 may be completely controlled by server application 230. Full-duplex bi-directional communication may be limited to clients that have been explicitly identified by full-duplex capable server 102. Client application 280 that is not controlled by server application 230 may be required to advise of its capability to engage in full-duplex bi-directional communication by streaming URL parameters and/or headers to server application 230. Client application 280 that is not controlled by server application 230 and/or not verified as having full-duplex bi-directional communication capability by server application 230 should not be engaged in full-duplex bi-directional communication.

In an embodiment, full-duplex communication between full-duplex capable client 112 and full-duplex capable server 102 may be established when client proxy 270, network proxy 250, and server proxy 220 allow such full-duplex communication. As would be appreciated by one having skill in the relevant art(s) given the description herein, a proxy acts as an intermediary for requests between communication devices such as but not limited to clients, servers, or networks seeking to use each others' resources. A proxy relies on filtering rules for allowing or disallowing access to the communication device that the proxy represents. For example, a proxy may use filtering rules that allow requests based on a communication protocol such as HTTP to access the communication device but disallow other protocol based requests.

Network proxy 250, server proxy 220, and client proxy 270 include filtering rules that allow data streams based on a RPC based communication protocol to stream into network 108, full-duplex capable server 102, and full-duplex capable client 112, respectively. If the data streams are based on a communication protocol different than RPC, then network proxy 250, server proxy 220, and client proxy 270 may deny the data streams access to network 108, full-duplex capable server 102, and full-duplex capable client 112, respectively. However, the request and response data streams generated by full-duplex capable client 112 and full-duplex capable server 102 are a RPC based communication protocol. As a result, network proxy 250, server proxy 220, and client proxy 270 allow the request and the response data streams to flow freely between full-duplex capable client 112 and full-duplex capable server 102 via network 108.

In an embodiment, network proxy 250, server proxy 220, and client proxy 270, may disallow an early response from full-duplex capable server 102. Network proxy 250, server proxy 220, and client proxy 270 may also buffer requests from full-duplex capable client 112 and responses from full-duplex capable server 102. In buffering, client application 280 and/or server application 230 may switch from full-duplex bi-directional communication to a different protocol that uses two connections rather than single TCP connection 130. Full-duplex capable client 112 and full-duplex capable server 102 may implement such fall back techniques such as polling. Full-duplex capable client 112 may also implement the fall back technique of waiting for the initial response from full-duplex capable server 102 for a short time-out period.

In an embodiment, full-duplex capable client 112 and full-duplex capable server 102 each have a communication interface. Client communication stack 260 acts as a communication interface for full-duplex capable client 112. Server communication stack 210 acts as a communication interface for full-duplex capable server 102.

Client communication stack 260 of full-duplex capable server 102 receives the request generated by client application 280. Client communication stack 260 initiates the request data stream over single TCP connection 130 via network 108 to server communication stack 210. The request data stream generated by full-duplex capable client 112 is based on a RPC based communication protocol so network proxy 250 and server proxy 220 allow the request data stream to flow through network 108 and access full-duplex capable server 102. Server communication stack 210 receives the request data stream from full-duplex capable client 112 and transfers the request data stream to server application 230.

Server application 230 sends a response to the request data stream to server communication stack 210. Server communication stack 210 initiates the response data stream over single TCP connection 130 via network 108 to client communication stack 260. The response data stream generated by full-duplex capable server 102 is based on a RPC based communication protocol so network proxy 250 and client proxy 270 allow the response data stream to flow through network 108 and access full-duplex capable client 112. Client communication stack 260 receives the response data stream and sends the response to client application 280. The request data stream and the response data stream operate simultaneously over single TCP connection 130 establishing full-duplex bi-directional communication. Server communication stack 210 and client communication stack 260 provide messaging support and required delivery guarantees.

Full-Duplex Bi-Directional Communication Semantics

Figure 3:
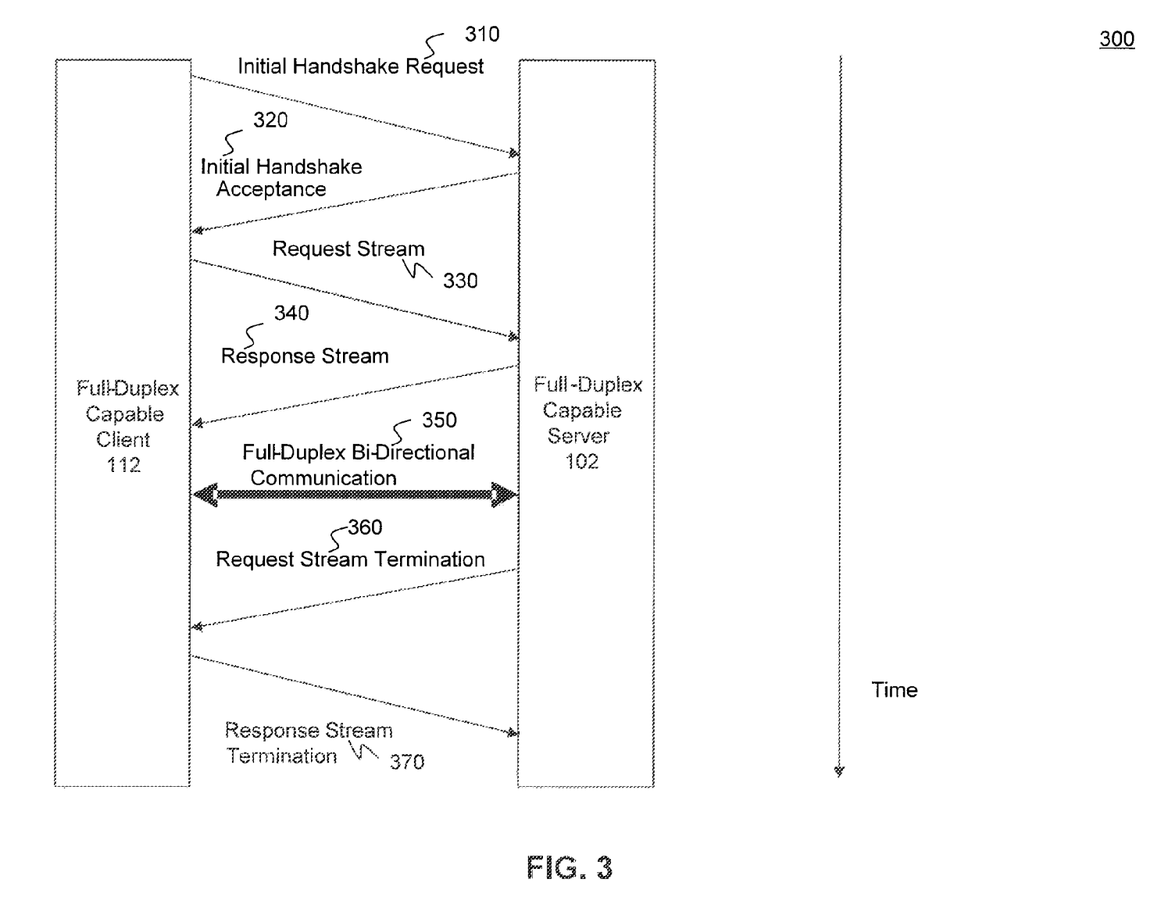
FIG. 3 illustrates a client server full-duplex bi-directional communication protocol, according to an embodiment.

FIG. 3 depicts an example full-duplex bi-directional communication system 300 in which embodiments, or portions thereof, may be implemented. System 300 includes full-duplex capable client 112 and full-duplex capable server 102. Full-duplex capable client 112 and full-duplex capable server 102 engage in a series of data exchanges to establish full-duplex bi-directional communication.

In an embodiment, full-duplex capable client 112 and full-duplex capable server 102 establish full-duplex communication by following a series of full-duplex bi-directional communication semantics. Full-duplex capable client 112 initiates full-duplex communication with full-duplex capable server 102 by sending an initial handshake request 310 to full-duplex capable server 102. Full-duplex capable server 102 either accepts or rejects initial handshake request 310. If full-duplex capable server 102 rejects initial handshake request 310, full-duplex communication between full-duplex capable client 112 and full-duplex capable server 102 fails.

If full-duplex capable server 102 accepts initial handshake request 310 from full-duplex capable client 112, then full-duplex communication between full-duplex capable server 102 and full-duplex capable client 112 is established. Full-duplex capable server 102 accepts initial handshake request 310 by responding with initial handshake acceptance 320. Once full-duplex capable client 112 receives initial handshake acceptance 320, full-duplex communication between full-duplex capable client 112 and full-duplex capable server 102 is finalized.

In an embodiment, full-duplex communication between full-duplex capable client 112 and full-duplex capable server 102 may be established by the completion of a handshake based on HTTP semantics. Initial handshake request 310 follows HTTP semantics. Full-duplex capable client 112 sends a HTTP request to full-duplex capable server 102. The HTTP request is followed by a body completing initial handshake request 310. Initial handshake acceptance 320 also follows HTTP semantics where full-duplex capable server 102 responds to initial handshake request 310 by sending the response headers to full-duplex capable client 112. Once full-duplex capable client 112 has received the header from full-duplex capable server 102, the HTTP based handshake has been completed and full-duplex communication between full-duplex capable client 112 and full-duplex capable server 102 is established.

In an embodiment, data streaming between full-duplex capable client 112 and full-duplex capable server 102 is initiated following the receipt of initial handshake acceptance 320 by full-duplex capable client 112. Full-duplex capable client 112 initiates request stream 330 and streams request stream 330 to full-duplex capable server 102. Full-duplex capable server 102 receives request stream 330 from full-duplex capable client 112 and, before completion of request stream 330, responds by streaming response stream 340 to full-duplex capable client 112. Full-duplex bi-directional communication 350 may be established when full-duplex capable client 112 streams request stream 330 to full-duplex capable server 102 and full-duplex capable server 102 streams response stream 340 to full-duplex capable client 112 over single TCP connection 130 simultaneously.

In an embodiment, full-duplex bi-directional communication 350 continues between full-duplex capable client 112 and full-duplex capable server 102 until full-duplex capable client 112 terminates request stream 330. The terminating of request stream 330 by full-duplex capable client 112 terminates full-duplex bi-directional communication 350 but does not terminate the communication link. Full-duplex capable client 112 continues to receive response stream 340 from full-duplex capable server 102 as long as full-duplex capable server 102 continues to stream response stream 340. Full-duplex communication is terminated when full-duplex capable server 102 terminates streaming response stream 340 and full-duplex capable client 112 receives response stream termination 370 signifying the end of response stream 340.

Before full-duplex capable server 102 receives request stream termination 360 signifying the end of request stream 330, full-duplex capable server 102 may terminate response stream 340. Full-duplex capable server 102 terminating response stream 340 before receiving request stream termination 360 is considered an illegal state in HTTP where request stream 330 continues after response stream 340 has been terminated. Therefore, full-duplex capable client 112 may terminate request stream 330 immediately upon receiving response stream termination 370 from full-duplex capable server 102 signifying the end of response stream 340.

In an embodiment, full-duplex bi-directional communication 350 between full-duplex capable client 112 and full-duplex capable server 102 is established over a RPC based communication protocol that may include HTTP. In such an embodiment, full-duplex bi-directional communication 350 follows standard HTTP semantics. Following the success of initial handshake request 310 by full-duplex capable server 102 that typically involves the acceptance of the complete headers, full-duplex capable client 112 initiates request stream 330 to full-duplex capable server 102. Following HTTP semantics, full-duplex capable server 102 refuses to generate response stream 340 until full-duplex capable server 102 has received a portion of request stream 330 from full-duplex capable client 112.

Once full-duplex capable server 102 has received request stream 330 from full-duplex capable client 112, full-duplex capable server 102 initiates response stream 340 to full-duplex capable client 112. Full-duplex capable server 102 refrains from terminating the streaming of response stream 340 until full-duplex capable server 102 has received request stream termination 360 signifying the end of request stream 330 from full-duplex capable client 112. Full-duplex capable client 112 continues to receive response stream 340 from full-duplex capable server 102 until full-duplex capable client 112 receives response stream termination 370 from full-duplex capable server 102 signifying the end of response stream 340.

In an embodiment, full-duplex bi-directional communication 350 between full-duplex capable client 112 and full-duplex capable server 102 is terminated based on error conditions. Specifically, full-duplex capable client 112 terminates request stream 330 when full-duplex capable client 112 receives an error response in response stream 340 from full-duplex capable server 102, thereby terminating full-duplex bi-directional communication 350.

Full-duplex capable client 112 terminates request stream 330 when full-duplex capable client 112 is incapable of streaming request stream 330 or when request stream 330 times out, thereby terminating full-duplex bi-directional communication 350. Likewise, full-duplex capable server 102 terminates response stream 340 when full-duplex capable server 102 is incapable of streaming response stream 340, or when response stream 340 times out, thereby terminating full-duplex bi-directional communication 350.

In an embodiment, full-duplex bi-directional communication 350 between full-duplex capable client 112 and full-duplex capable server 102 may support pipelining. Full-duplex capable client 112 and full-duplex capable server 102 may support pipelining by maintaining persistent connections. Full-duplex capable client 112 and full-duplex capable server 102 maintain persistent connections by using the same single TCP connection 130 rather interchanging between different TCP connections when engaging in full-duplex bi-directional communication 350. Full-duplex capable client 112 when generating request stream 330 may make single TCP connection 130 unavailable for pipelined requests. Full-duplex capable server 102 continuing response stream 340 after the termination of request stream 330 may prevent any pipelined requests from being processed.

System 400

Figure 4:
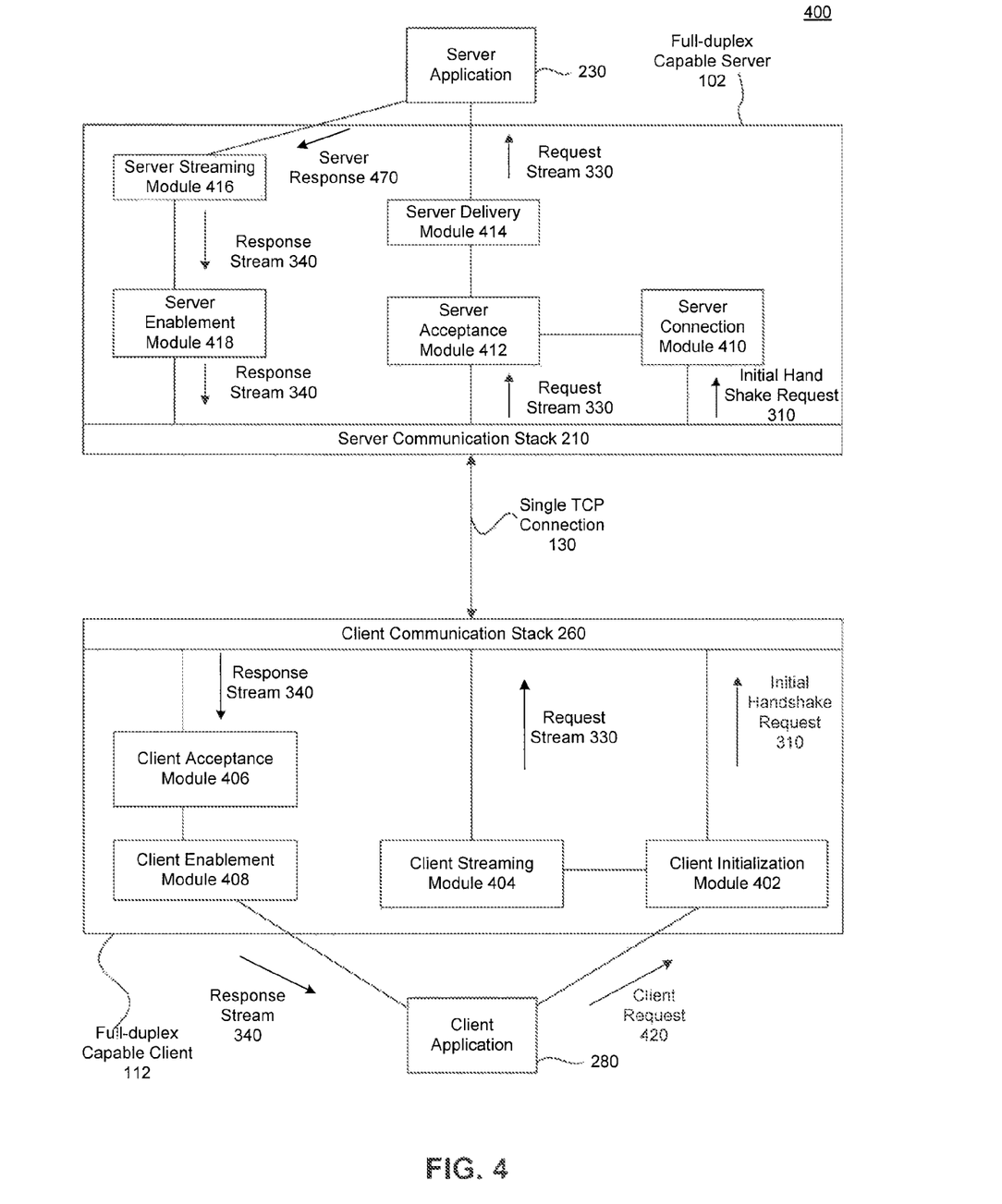
FIG. 4 illustrates a full-duplex bi-directional communication system architecture, according to an embodiment.

FIG. 4 is an example system architecture 400 in which embodiments of the present invention or portions thereof, may be implemented. System architecture 400 includes client initialization module 402 coupled to client application 280. Client enablement module 408 may also be coupled to client application 280.

Server delivery module 414 may be coupled to server application 230. Server streaming module 416 may also be coupled to server application 230. While the embodiment depicted in FIG. 4 shows client application 280 coupled to client initialization module 402 and client enablement module 408 and server application 230 coupled to server delivery module 414 and server streaming module 416, it is important to note that embodiments can be used to exchange data between a variety of different types of computer-implemented data sources, systems and architectures, such as a networked cloud based architecture.

Full-duplex capable client 112 includes client communication stack 260, client initialization module 402 that initializes initial handshake request 310, client streaming module 404 that generates request stream 330, client acceptance module 406 that receives response stream 340, and client enablement module 408. Full-duplex capable server 102 includes server communication stack 210, server connection module 410 that receives initial handshake request 310, server acceptance module 412 that receives request stream 330, server delivery module 414 that transfers request stream 330, server streaming module 416 that receives server response 470 and generates response stream 340, and server enablement module 418. Full-duplex capable client 112 and full-duplex capable server 102 communicate over single TCP connection 130.

In general, full-duplex bi-directional communication between full-duplex capable client 112 and full-duplex capable server 102 operates as follows. Client application 280 supplies client request 420, where client request 420 is a request to initialize communication with server application 230. Client initialization module 402 receives client request 420 from client application 280. Based on client request 420, client initialization module 402 generates initial handshake request 310 to initialize full-duplex communication over single TCP connection 130 between full-duplex capable client 112 and full-duplex capable server 102. Communication links such as single TCP connection 130 may be reused across streaming RPC connections.

In an embodiment, client communication stack 260 and server communication stack 210 may be interfaces for full-duplex capable client 112 and full-duplex capable server 102, respectively. Client communication stack 260 receives initial handshake request 310 from client initialization module 402 and sends initial handshake request 310 to full-duplex capable server 102 over single TCP connection 130. Server communication stack 210 receives initial handshake request 310 from full-duplex capable client 112 over single TCP connection 130. Server communication stack 210 sends initial handshake request 310 to server connection module 410. Server connection module 410 accepts initial handshake request 310 finalizing the handshake between full-duplex capable client 112 and full-duplex capable server 102 over single TCP connection 130.

Once the handshake between full-duplex capable client 112 and full-duplex capable server 102 over single TCP connection 130 has been finalized, client streaming module 404 generates request stream 330 that contains client request 420. Client communication stack 260 receives request stream 330 from client streaming module 404 and streams request stream 330 over single TCP connection 130 to full-duplex capable server 102. Server communication stack 210 receives request stream 330 from full-duplex capable client 112. Server communication stack 210 sends request stream 330 to server acceptance module 412. Server acceptance module 412 accepts request stream 330.

In an embodiment, server acceptance module 412 sends request stream 330 to server delivery module 414. Server delivery module 414 transfers request stream 330 to server application 230. Server application 230 receives request stream 330 containing client request 420 and responds to client request 420 with server response 470. Server application 230 sends server response 470 to server streaming module 416. Server streaming module 416 receives server response 470 and generates response stream 340 that contains server response 470. Server streaming module 416 streams server response stream 340 to server enablement module 418.

In an embodiment, server enablement module 418 enables a full-duplex bi-directional communication stream over single TCP connection 130 when server enablement module 418 streams response stream 340 to server communication stack 210. Server communication stack 210 in turn sends response stream 340 over single TCP connection 130 to full-duplex capable client 112 as full-duplex capable client 112 streams request stream 330 to full-duplex capable server 102 enabling full-duplex bi-directional communication.

In an embodiment, client communication stack 260 receives response stream 340 from full-duplex capable server 102 over single TCP connection 130. Client communication stack 260 sends response stream 340 to client acceptance module 406. Client acceptance module 406 accepts response stream 340 while full-duplex capable client 112 streams request stream 330 to full-duplex capable server 102. Client acceptance module sends server response stream 340 to client enablement module 308. Client enablement module 308 enables full-duplex bi-directional communication between full-duplex capable client 112 and full-duplex capable server 102 when response stream 340 streams to full-duplex capable client 112 and request stream 330 streams to full-duplex capable server 102 simultaneously over single TCP connection 130.

Modules may be used by full-duplex capable client 112 and full-duplex capable server 102. As referred to herein, a module may be any type of processing (or computing) device having one or more processors. For example, a module can be a workstation, mobile device, computer, cluster of computers, set-top box, or other devices having at least one processor. In an embodiment, multiple modules may be implemented on the same processing device. Software may include one or more applications and an operating system. Hardware can include, but may not be limited to, a processor, memory, and/or graphical user interface display.

Method 500

Figure 5:
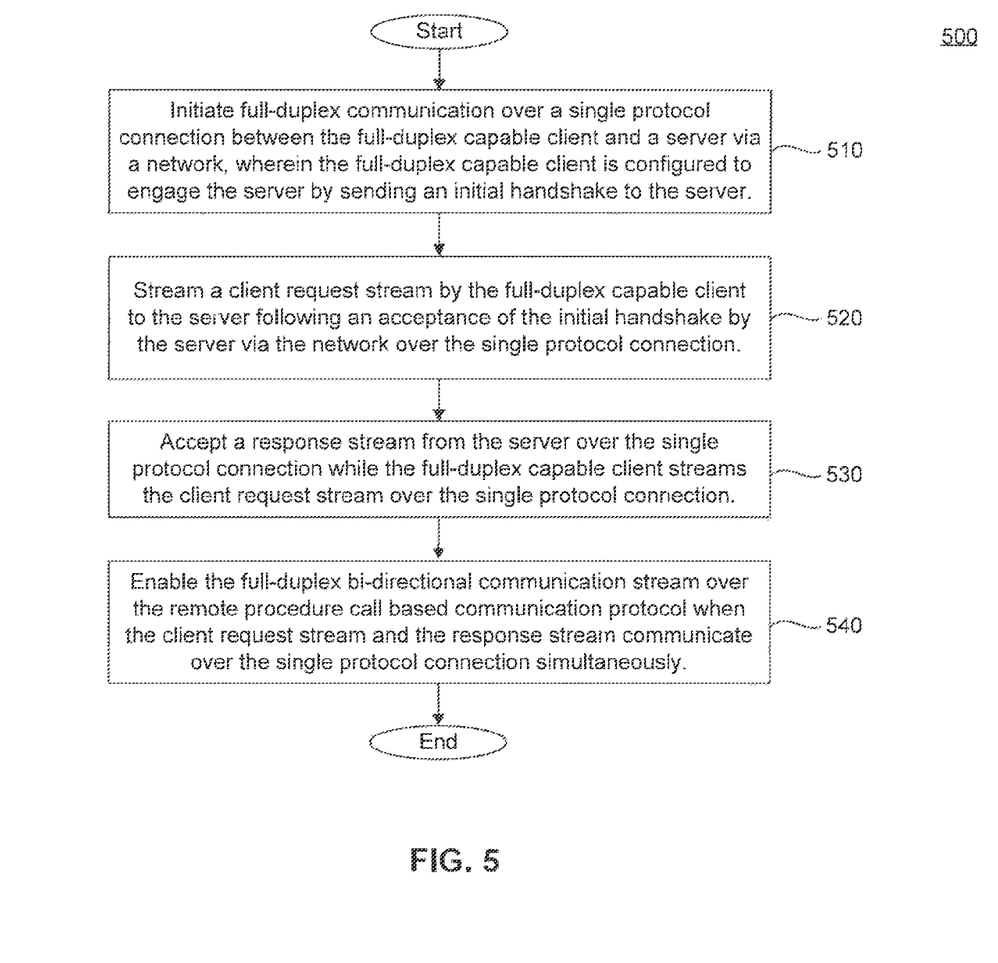
FIG. 5 illustrates a flow chart illustrating an exemplary aspect of operation for a full-duplex capable client, according to an embodiment.

FIG. 5 illustrates a flowchart of an exemplary method 500 of establishing full-duplex bi-directional communication with a full-duplex capable client. As shown in FIG. 5, method 500 begins at step 510, when the full-duplex capable client initiates full-duplex communication with a server. For example, as shown in FIG. 1 and FIG. 3 full-duplex capable client 112 initiates full-duplex communication over single TCP connection 130 between full-duplex capable client 112 and full-duplex capable server 102 via network 108. Full-duplex capable client 112 is configured to engage full-duplex capable server 102 by sending initial handshake request 310 to full-duplex capable server 102. Step 510 may be performed by, for example, client initialization module 402. Once step 510 is complete, method 500 proceeds to step 520.

At step 520, the full-duplex capable client streams a client request stream to the server. For example, as shown in FIG. 1 and FIG. 3, full-duplex capable client 112 streams request stream 330 to full-duplex capable server 102 following initial handshake acceptance 320 of initial handshake request 310 by full-duplex capable server 102 via network 198 Over single TCP connection 130. Step 520 may be performed by, for example, client streaming module 404. Once step 520 is complete, method 500 proceeds to step $30.

At step 530, the full-duplex capable client accepts a response stream from the server. For example, as shown in FIG. 1 and FIG. 3, full-duplex capable client 112 accepts response stream 340 from full-duplex capable server 102 over single TCP connection 130 while full-duplex capable client 112 streams request stream 330 over single TCP connection 130. Step 540 may be performed by, for example, client acceptance module 406. Once step 530 is complete, method 500 proceeds to step 540.

At step 540, the full-duplex bi-directional communication stream is enabled over the remote procedure call based communication protocol. For example, as shown in FIG. 1 and FIG. 3, the full-duplex bi-directional communication 350 is enabled over the remote procedure call based communication protocol when request stream 330 and response stream 340 communicate over single TCP connection 130 simultaneously. Step 540 may be performed by, for example, client enablement module 408. When step 540 is complete, method 500 ends.

Embodiments can work with software, hardware, and/or operating system implementations other than those described herein. Any software, hardware, and operating system implementations suitable for performing the functions described herein can be used. Embodiments are applicable to both a client and to a server or a combination of both.

Method 600

Figure 6:
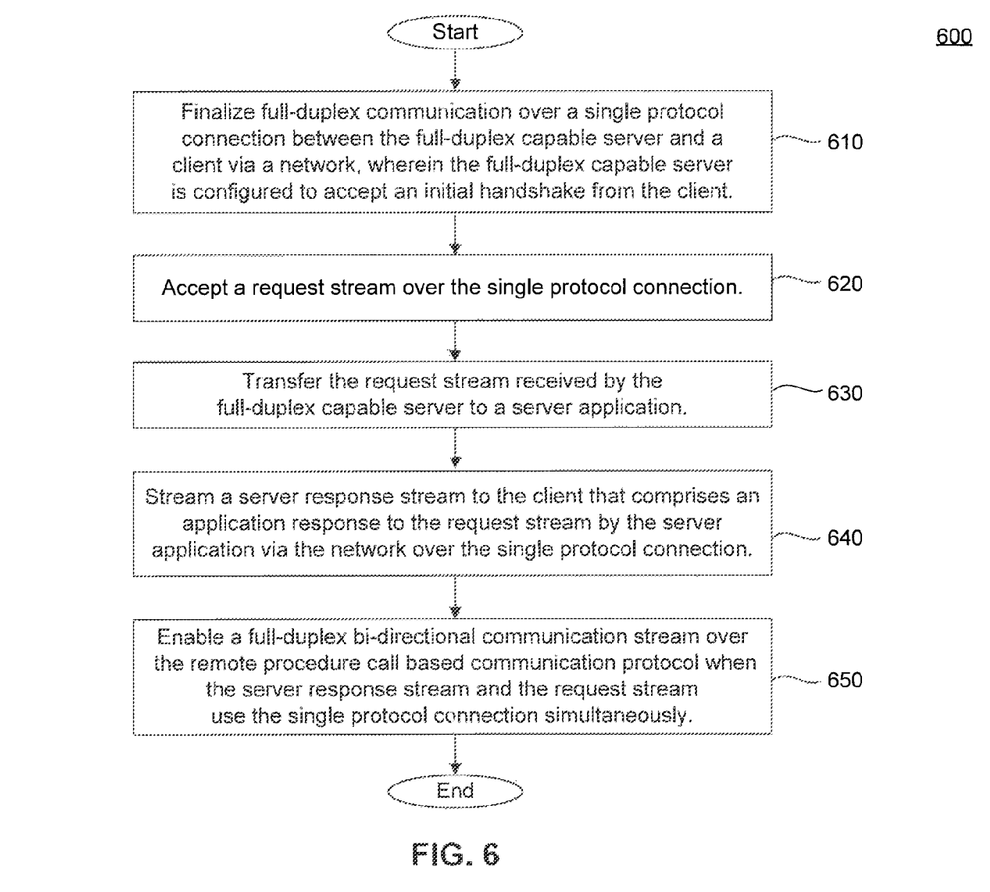
FIG. 6 illustrates a flow chart illustrating an exemplary aspect of operation for a full-duplex capable server, according to an embodiment.

FIG. 6 illustrates a flowchart of an exemplary method 600 for establishing full-duplex bi-directional communication with a full-duplex capable server. As shown in FIG. 6, method 600 begins at step 610, where full-duplex communication is finalized over a single protocol connection between the full-duplex capable server and a client via a network. For example, as shown in FIG. 1 and FIG. 3, full-duplex communication is finalized over single TCP connection 130 between full-duplex capable server 102 and full-duplex capable client 112 via network 108. Full-duplex capable server 102 is configured to accept initial handshake request 310, from full-duplex capable client 112. Step 610 may be performed by, for example, server connection module 410. Once step 610 is complete, method 600 proceeds to step 720.

At step 620, the full-duplex capable server accepts a request stream over the single protocol connection. For example, as shown in FIG. 1 and FIG. 3, full-duplex capable server 102 accepts request stream 330 over single TCP connection 130. Step 620 may be performed by, for example, server acceptance module 412. Once step 620 is complete, method 600 proceeds to step 630.

At step 630, the request stream received by the full-duplex capable server is transferred to a server application. For example, as shown in FIG. 1 and FIG. 2 and FIG. 3, request stream 330 received by full-duplex capable server 102 is transferred to server application 230. Step 630 may be performed by, for example, server delivery module 414. Once step 630 is complete, method 600 proceeds to step 740.

At step 640, the full-duplex capable server streams a server response stream to the client. For example, as shown in FIG. 1 and FIG. 3, full-duplex capable server 102 streams response stream 340 to full-duplex capable client 112 that comprises of an application response to request stream 330 by server application 230 via network 108 over single TCP connection 130. Step 640, may be performed by, for example, server streaming module 416. Once step 640 is complete, method 600 proceeds to step 650.

At step 650, a full-duplex bi-directional communication stream is enabled over the remote procedure call based communication protocol. For example, as shown in FIG. 1 and FIG. 3, full-duplex bi-directional communication 350 is enabled over the remote procedure call based communication protocol when response stream 340 and request stream 330 use single TCP connection 130, simultaneously. When step 650 is complete, method 600 ends.

Embodiments can work with software, hardware, and/or operating system implementations other than those described herein. Any software, hardware, and operating system implementations suitable for performing the functions described herein can be used. Embodiments are applicable to both a client and to a server or a combination of both.

CONCLUSION

Embodiments can work with software, hardware, and/or operating system implementations other than those described herein. Any software, hardware, and operating system implementations suitable for performing the functions described herein can be used. Embodiments are applicable to both a client and to a server or a combination of both.

The Brief Summary and Abstract sections may set forth one or more but not all exemplary embodiments as contemplated by the inventors, and thus, are not intended to limit the present invention and the appended claims in any way.

Embodiments have been described above with the aid of functional blocks illustrating the implementation of specified functions and relationships thereof. The boundaries of these functional blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of descriptions and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for providing a full-duplex capable client to establish a full-duplex bi-directional communication stream, comprising:

initiating, using a remote procedure call (RPC) based communication protocol, full-duplex communication over a single protocol connection between the full-duplex capable client and a server via a network, wherein the full-duplex capable client is configured to engage the server by sending an initial handshake to the server, the initial handshake including a request and a body;

receiving an acceptance of the initial handshake, wherein the acceptance of the initial handshake by the server establishes communication between the full-duplex capable client and the server;

streaming a client request stream by the full-duplex capable client to the server following the acceptance of the initial handshake by the server via the network over the single protocol connection;

accepting a response stream from the server over the single protocol connection while the full-duplex capable client streams the client request stream over the single protocol connection; and enabling the full-duplex bi-directional communication stream over the RPC based communication protocol when the client request stream and the response stream communicate over the single protocol connection simultaneously.

2. The method of claim 1, wherein the single protocol connection uses a reliable streaming protocol.

3. The method of claim 1, further comprising:
streaming additional pipelined client requests to the server over the single protocol connection; and
receiving additional pipelined responses from the server over the single protocol connection.

4. The method of claim 1, further comprising:
receiving a stream termination response from the server over the single protocol connection; and
immediately terminating the full-duplex bi-directional communication stream.

5. The method of claim 1, further comprising:
receiving an error response from the server over the single protocol connection;
sending a stream termination request to the server over the single protocol connection; and
terminating the full-duplex bi-directional communication stream.

6. A computer implemented method for providing a full-duplex capable server to establish a full-duplex bi-directional communication stream, comprising:
finalizing, using a remote procedure call (RPC) based communication protocol, full-duplex communication over a single protocol connection between the full-duplex capable server and a client via a network, wherein the full-duplex capable server is configured to accept an initial handshake from the client, the initial handshake including a request and a body;
responding to the initial handshake request by sending an acceptance of the initial handshake, wherein the acceptance of the initial handshake by the full-duplex capable server establishes communication between the full-duplex capable server and the client;
transferring a request stream received by the full-duplex capable server to a server application;
streaming a server response stream to the client that comprises an application response to the request stream by the server application via the network over the single protocol connection; and
enabling a full-duplex bi-directional communication stream over the RPC based communication protocol when the server response stream and the request stream use the single protocol connection simultaneously.

7. The method of claim 6, wherein the single protocol connection uses a reliable streaming protocol.

8. The method of claim 6, further comprising:
transferring additional pipelined client requests received by the full-duplex capable server to the server application; and
streaming additional pipelined server responses to the client that comprise application responses to the additional pipelined client requests by the server application via the network over the single protocol connection.

9. The method of claim 6, further comprising:
streaming a stream termination response to the client over the single protocol connection; and
terminating the full-duplex bi-directional communication stream.

10. The method of claim 6, further comprising:
streaming an error response to the client over the single protocol connection;
receiving a stream termination request from the client; and
terminating the full-duplex bi-directional communication stream.

11. A system for providing a full-duplex capable client to establish a full-duplex bi-directional communication stream, comprising:
a memory; and
at least one processor coupled to the memory and configured to:
initiate, using a remote procedure call (RPC) based communication protocol, full-duplex communication over a single protocol connection between the full-duplex capable client and a server via a network, wherein the full-duplex capable client is configured to engage the server by sending an initial handshake to the server, the initial handshake including a request and a body;
receive an acceptance of the initial handshake, wherein the acceptance of the initial handshake by the server establishes communication between the full-duplex capable client and the server;
stream a client request stream by the full-duplex capable client to the server following the acceptance of the initial handshake by the server via the network over the single protocol connection;
accept a response stream from the server over the single protocol connection while the full-duplex capable client streams the client request stream over the single protocol connection; and
enable the full-duplex bi-directional communication stream over the RPC based communication protocol when the client request stream and the response stream communicate over the single protocol connection simultaneously.

12. The system of claim 11, wherein the single protocol connection uses a reliable streaming protocol.

13. The system of claim 11, the at least one processor further configured to:
stream additional pipelined client requests to the server over the single protocol connection; and
receive additional pipelined responses from the server over the single protocol connection.

14. The system of claim 11, the at least one processor further configured to:
receive a stream termination response from the server over the single protocol connection; and
immediately terminate the full-duplex bi-directional communication stream.

15. The system of claim 11, the at least one processor further configured to:
- receive an error response from the server over the single protocol connection;
- send a stream termination request to the server over the single protocol connection; and
- terminate the full-duplex bi-directional communication stream.

16. A system for providing a full-duplex capable client to establish a full-duplex bi-directional communication stream, comprising:
- a memory; and
- at least one processor coupled to the memory and configured to:
  - finalize, using a remote procedure call (RPC) based communication protocol, full-duplex communication over a single protocol connection between the full-duplex capable server and a client via a network, wherein the full-duplex capable server is configured to accept an initial handshake from the client, the initial handshake including a request and a body;
  - respond to the initial handshake request by sending an acceptance of the initial handshake, wherein the acceptance of the initial handshake by the full-duplex capable server establishes communication between the full-duplex capable server and the client;
  - transfer a request stream received by the full-duplex capable server to a server application;
  - stream a server response stream to the client that comprises an application response to the request stream by the server application via the network over the single protocol connection; and
  - enable a full-duplex bi-directional communication stream over the RPC based communication protocol when the server response stream and the request stream use the single protocol connection simultaneously.

17. The system of claim 16, wherein the single protocol connection uses a reliable streaming protocol.

18. The system of claim 16, the at least one processor further configured to:
- transfer additional pipelined client requests received by the full-duplex capable server to the server application; and
- stream additional pipelined server responses to the client that comprise application responses to the additional pipelined client requests by the server application via the network over the single protocol connection.

19. The system of claim 16, the at least one processor further configured to:
- stream a stream termination response to the client over the single protocol connection; and
- terminate the full-duplex bi-directional communication stream.

20. The system of claim 16, the at least one processor further configured to:
- stream an error response to the client over the single protocol connection;
- receive a stream termination request from the client; and
- terminate the full-duplex bi-directional communication stream.

21. A computer implemented method, comprising:
- initiating, using a remote procedure call (RPC) based communication protocol, full-duplex communication over a single protocol connection between the full-duplex capable client and a server via a network, wherein the full-duplex capable client is configured to engage the server by sending an initial handshake to the server, the initial handshake including a request and a body;
- waiting for a time-out period to determine that an acceptance of the initial handshake by the server is absent; and
- initializing a fallback communication method, wherein the fallback communication method is a bi-directional, dual TCP connection method.

22. The method of claim 21, wherein the fallback communication method is a hanging GET method.

23. The method of claim 21, wherein the fallback communication method is a long polling method.

24. The method of claim 21, wherein the fallback communication method is a long-lived request method.

25. A system, comprising:
- a memory; and
- at least one processor coupled to the memory and configured to:
  - initiate, using a remote procedure call (RPC) based communication protocol, full-duplex communication over a single protocol connection between the full-duplex capable client and a server via a network, wherein the full-duplex capable client is configured to engage the server by sending an initial handshake to the server, the initial handshake including a request and a body;
  - wait for a time-out period to determine that an acceptance of the initial handshake by the server is absent; and
  - initialize a fallback communication method, wherein the fallback communication method is a bi-directional, dual TCP connection method.

26. The system of claim 25, wherein the fallback communication method is a hanging GET method.

27. The system of claim 25, wherein the fallback communication method is a long polling method.

28. The system of claim 25, wherein the fallback communication method is a long-lived request method.

* * * * *